(12) United States Patent
Rougeaux et al.

(10) Patent No.: US 6,545,145 B1
(45) Date of Patent: Apr. 8, 2003

(54) **PURIFIED *ALTEROMONAS MACLEODII* POLYSACCHARIDE AND ITS USES**

(75) Inventors: Hèléne Rougeaux, Brest (FR); Jean Guezennec, Plouzane (FR)

(73) Assignees: Institut Francais de Recherche pour L'Exploitation de la Mer (Ifremer), Issy-les-Moulineaux (FR); Cooperative Laitiere de Ploudaniel, Ploudaniel (FR)

( * ) Notice: Subject to any disclaimer, the term of this patent is extended or adjusted under 35 U.S.C. 154(b) by 0 days.

(21) Appl. No.: 09/720,238
(22) PCT Filed: Jun. 22, 1999
(86) PCT No.: PCT/FR99/01490
§ 371 (c)(1),
(2), (4) Date: Mar. 2, 2001
(87) PCT Pub. No.: WO99/67411
PCT Pub. Date: Dec. 29, 1999

(30) Foreign Application Priority Data

Jun. 22, 1998 (FR) .............................................. 98 07839

(51) Int. Cl.$^7$ .............................. C08B 37/00; A23G 3/00
(52) U.S. Cl. ...................................... 536/55.1; 426/658
(58) Field of Search .......................... 536/55.1; 426/658

(56) References Cited

U.S. PATENT DOCUMENTS 5,071,976 A    12/1991  Stirling

FOREIGN PATENT DOCUMENTS

| FR | 2 701 488  | 8/1994 |
| JP | 59-156253  | 9/1984 |
| JP | 61-183301  | 8/1986 |

OTHER PUBLICATIONS

H. Rougeaux, et al., Carbohydrate Polymers, vol. 31, No. 4, pp. 237–242, "Novel Bacterial Exopolysaccharides From Deep–Sea Hydrothermal Vents", 1996.

Gerard Raguenes, et al., Applied and Environmental Microbiology, vol. 62, No. 1, pp. 67–73, "Description of a New Polymer–Secreting Bacterium From Deep–Sea Hydrothermal Vent, *Alteromonas macleodii* Subsp. Fijiensis, and Preliminary Characterization of the Polymer", Jan. 1996.

*Primary Examiner*—Raymond Henley, III
(74) *Attorney, Agent, or Firm*—Oblon, Spivak, McClelland, Maier & Neustadt, P.C.

(57) ABSTRACT

The invention concerns a purified polysaccharide consisting of glucose, galactose, glucuronic acid, galacturonic acid, and pyruvate mannose, combined in a repeat hexasaccharide unit of formula (1), said polysaccharide comprising a saccharide units of formula (1), n being not less than 1. Said polysaccharide is useful in particular in the agri-foodstuff sector.

12 Claims, 5 Drawing Sheets

PURIFIED *ALTEROMONAS MACLEODII* POLYSACCHARIDE AND ITS USES

This is a 371 of PCT/FR99/01490 filed Jun. 22, 1999.

The present invention relates to a novel polysaccharide which is produced by a marine bacterium.

The bacterial subspecies *Alteromonas macleodii* subsp. *fijiensis* was isolated from submarine hydrothermal springs. When it is cultured under laboratory conditions on a glucose-rich medium, this bacterium secretes large quantities of exopolysaccharides. The morphological, physiological and phylogenetic characteristics of *Alteromonas macleodii* subsp. *fijiensis* are reported in the publication by RAGUENES et al., [Applied and Environmental Microbiology, 62(1), pp. 67–73, (1996)].

This publication also provides information on the overall composition of the polysaccharide mixture, which is produced by an *Alteromonas macleodii* subsp. *fijiensis* strain designated ST716 and cultured on glucose-enriched medium, and which is recovered from this medium by precipitating with ethanol.

This polysaccharide mixture comprises (percentages by weight) 10.5% of glucose, 11.1% of galactose, 4.4% of mannose, 5% of pyruvate-substituted mannose, 12.2% of glucuronic acid and 6.3% of galacturonic acid, corresponding to respective molar ratios of glucose, galactose, mannose, glucuronic acid and galacturonic acid of 1.0/1.1/0.6/1.1/0.6. Its content of sulfates is 5%.

The inventors have sought to identify the constituents of this mixture and have purified a novel polysaccharide from it.

This purified polysaccharide, which is the subject-matter of the present invention, is composed of glucose, galactose, glucuronic acid, galacturonic acid and pyruvate-substituted mannose.

It is characterized in that these different constituents are respectively present in the molar ratios of 1/1/1/2/1 and are combined in one repetitive hexasaccharide unit in which three glycosidic residues form a main chain whose branching point consists of a galacturonic acid residue. A side chain, which is terminated by a mannose residue which is substituted by pyruvate in position 4 and position 6, is grafted onto this latter galacturonic acid residue.

A polysaccharide in accordance with the invention consists of n hexasaccharide units (n being equal to or greater than 1), corresponding to the formula (I) below:

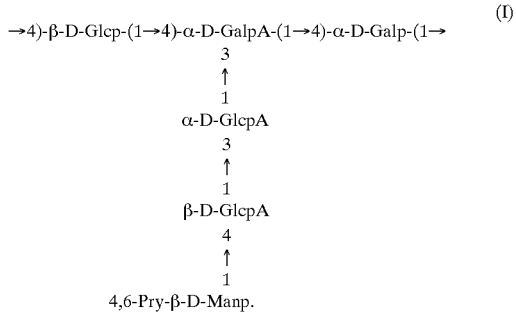

A polysaccharide according to the invention can, for example, be purified from the exopolysaccharides which are produced by the ST716 strain. On Oct. 17, 1995, this strain was deposited by IFREMER, in accordance with the Budapest Treaty, in the CNCM (Collection Nationale de Cultures de Microorganismes [National Collection of Microorganism Cultures]), which is held by the Pasteur Institute, 25 rue du Docteur Roux, Paris, under the number I-1627.

According to a preferred embodiment of the present invention, a polysaccharide of formula (I), which has been purified by anion exchange chromatography from the exopolysaccharide mixture secreted by *Alteromonas macleodii* subsp. *Fijiensis*, possesses an average molecular weight ($M_w$) of the order of $10^6$ Da, that is an average degree of polymerization, $DP_n$, of the order of 800.

The composition of the polysaccharide according to the invention, and its highly branched structure, confer on it the following rheological characteristics:

it possesses, for an average molecular weight ($M_w$) of the order of $10^6$ Da, an intrinsic viscosity, $\eta$, of the order of 2 600 ml.g$^{-1}$, its viscosity increases in the presence of $Ca^{2+}$ ions but it remains stable in the presence of $Mg^{2+}$ and $K^+$ ions;

it possesses a thickening power and a rheofluidifying behavior; these thickening properties are stable at a pH of between 4.5 and 9.

The invention therefore also relates to the use of a polysaccharide according to the invention as a thickening agent and as a rheofluidifying agent.

These rheological characteristics, combined with its hydrophilicity and its solubility, make the polysaccharide according to the invention of considerable interest for use in a variety of industries, in particular in the farm-produce industry, as a texturizing, stabilizing and/or thickening agent.

For this reason, the invention also relates to the use of a polysaccharide according to the invention as a texturizing, in particular stabilizing and/or thickening, agent in the farm-produce industry.

The invention more specifically relates to the use of a polysaccharide according to the invention for preparing a product which is intended for feeding to humans or animals.

The polysaccharides according to the invention can, for example, be used for conferring the desired consistency on liquid, creamy, pasty, gelatinous or semisolid products, while at the same time improving and/or stabilizing their texture.

In particular, the polysaccharides stabilize products which are subjected to substantial variations in temperature, for example during cooking or UHT treatment, or during freezing, when the polysaccharides prevent the formation of ice crystals.

The polysaccharides can also be used for retaining moisture in solid products, in order to impart a soft texture to these products and to ensure that this soft texture is preserved.

The polysaccharides according to the invention can be incorporated very readily and homogeneously into any preparations made in the presence of water. It is therefore very simple to use them in industrial processes and, in addition, they are particularly suitable for making "ready-to-use" products for reconstitution by the final consumer.

The polysaccharides according to the invention can also be used for clarifying liquid products which are intended for use as foodstuffs, such as wines or vinegar.

The present invention also encompasses products which are intended for feeding to humans or animals and which comprise at least one polysaccharide according to the invention.

The polysaccharides according to the invention are advantageously present in the products in question in a proportion of from 0.01 to 10%, preferably of from 0.05 to 5%, by weight, based on the total weight of the ingredients.

The present invention will be understood more fully with the aid of the remainder of the description, which follows and which refers to nonlimiting examples which illustrate the purification and characterization of a polysaccharide according to the invention and its properties and uses.

EXAMPLE 1

Obtaining a Preparation of Purified Polysaccharide

The exopolysaccharides secreted by the *Alteromonas macleodii* subsp. *fijiensis* strain C.N.C.M. I-1627 are obtained from cultures of this bacterium by precipitating with ethanol, as described by RAGUENES et al., [Applied and Environmental Microbiology, 62(1), pp. 67–73 (1996)].

After having been dissolved in Tris buffer (50 mM, pH 7.5), the exopolysaccharide mixture is loaded onto an anion exchange column (SEPHAROSE CL-6B gel). The column is eluted with a gradient of from 0.1 to 1M NaCl in the same buffer.

Figure 1:
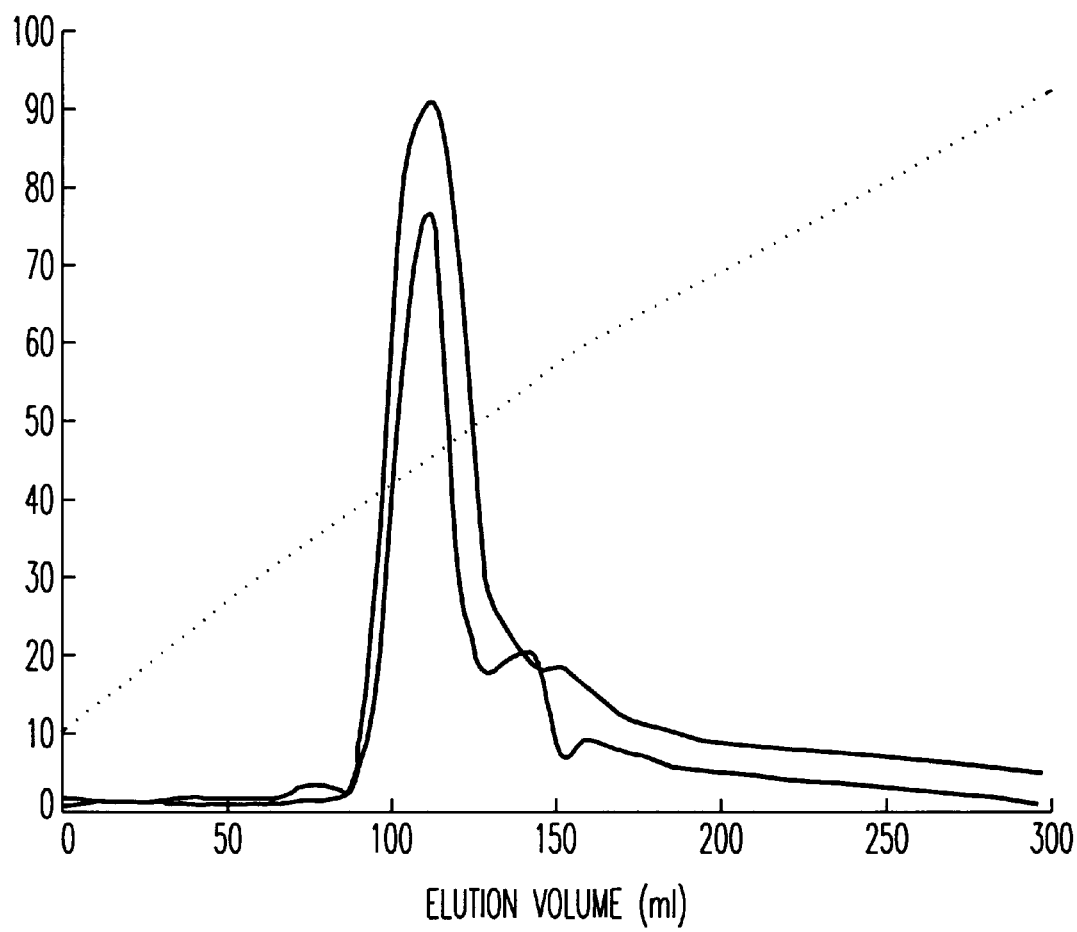
FIG. 1 shows the elution profile from an anion exchange column of the exopolysaccharide mixture obtained from cultures of *Alteromonas macleodii* subsp. *fijiensis* strain C.N.C.M. I-1627.

The elution profile is depicted in FIG. 1. The fractions from the main peak, corresponding to an NaCl concentration of 450 mM, were pooled, dialyzed and lyophilized.

The analyses carried out on these fractions show that no proteins are present and enable the contents of uronic acids and hexoses to be calculated to be 38% and 37%, respectively.

EXAMPLE 2

Determining the Physicochemical Characteristics of the Polysaccharide

Composition

The polysaccharide obtained as described in Example 1 is subjected to an acid methanolysis and the methylglycosides are converted into corresponding trimethylsilylated derivatives in accordance with the method of MONTREUIL et al. [Carbohydrate analysis: a practical approach, Chaplin M. F and Kennedy J. K. (Eds), I.R.L. Press Oxford, Washington D.C., Glycoproteins pp. 143–204 (1986)], after which they are analyzed by gas chromatography coupled to a mass spectrometer.

The neutral monosaccharides are also analyzed in the form of alditol acetates, after hydrolysis of the polysaccharide followed by a reduction and an acetylation in accordance with the method of BLAKENEY et al., [Carbohydr. Res., 113, pp. 291–299 (1983)].

The content of pyruvic acid is calculated with the aid of a calorimetric assay method using 2,4-dinitrophenylhydrazone [SLONEKER et al., Nature, 194, pp. 478–479, (1962)].

The absolute configuration of each of the residues making up the polysaccharide was determined in accordance with the method of GERWIG et al. [Carbohydr. Res., 62, pp. 349–357, (1978)]. The glycosidic residues derived from hydrolyzing the polysaccharide react with (+)2-butanol in the presence of trifluoroacetic acid. The resulting chiral derivatives are trimethylsilylated and then analyzed by gas chromatography.

Analysis of the residues in the form of alditol acetate and trimethylsilylated methyl glycosides indicate the presence of glucose, galactose, mannose, glucuronic acid and galacturonic acid in the relative proportions of 1:1:1:2:1 (1:1.1:0.6:1.1:0.6 in the case of the crude polymer). It was established that each of the residues had the D configuration. The content of pyruvic acid is calculated by colorimetric assay to be 7% by weight, a value which indicates that all the mannose residues are substituted.

Figure 2:
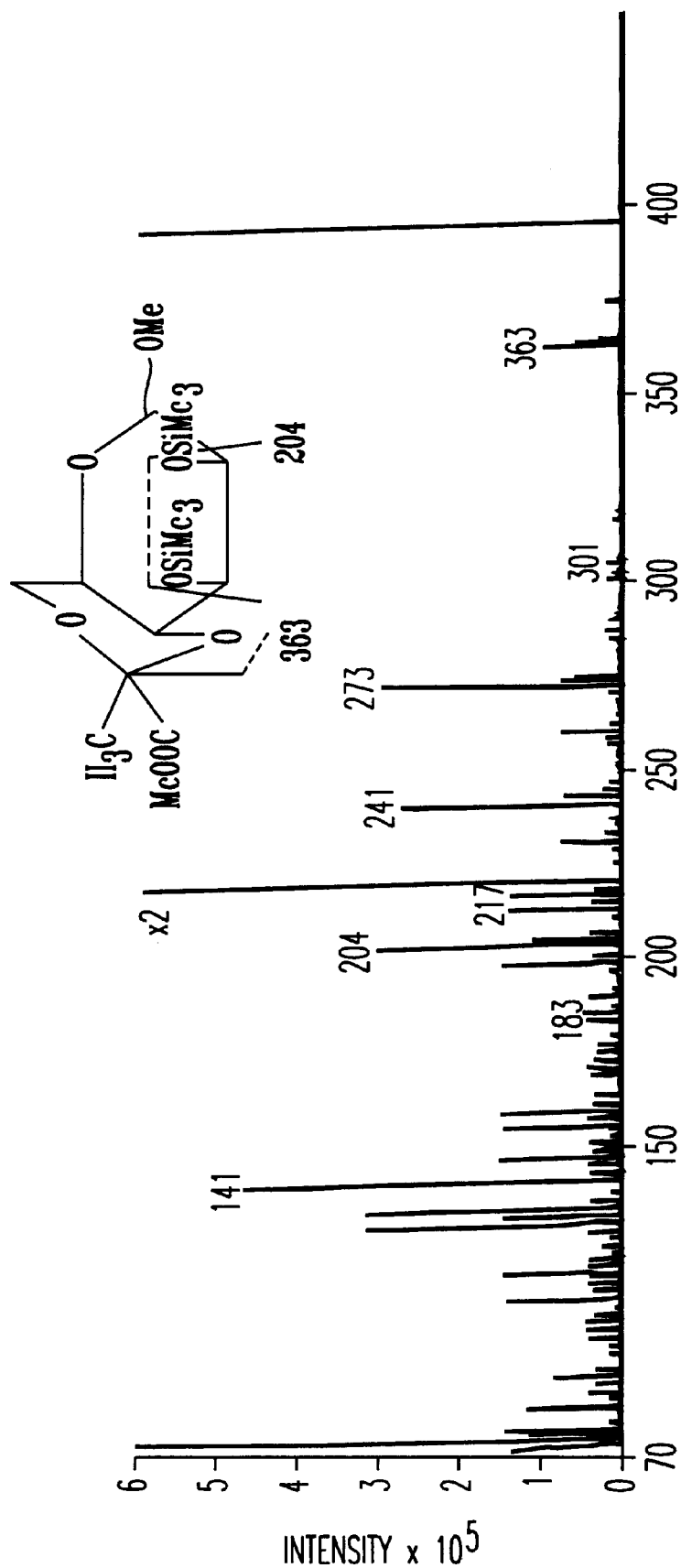
FIG. 2 shows the results of gas chromatographic analysis, coupled to the mass spectrometry of trimethylsilylated methylglycosides.

The results of the gas chromatographic analysis, coupled to the mass spectrometry of the trimethylsilylated methlyglycosides, are illustrated by FIG. 2. This analysis shows that the pyruvate groups are linked at positions 4 and 6 of the mannose residue.

Nature of the Glycosidic Bonds

Analyzing the polysaccharide by methylation made it possible to determine the cyclic form (pyranose or furanose), and the nature of the glycosidic bonds, of each of the residues of which it is composed. Using the method of HAKOMORI [J. Biochem, 55(2), pp. 205–208, 1964)], modified by D'AMBRA et al. [Carbohydr. Res., 177, pp. 111–116, (1988)], the free hydroxyl functions of the polysaccharide are methylated by the action of methylsulfinyl lithium carbanion and methyl iodide in dimethyl sulfoxide. The hydroxyl functions involved in bonds are then liberated by hydrolysis. The alditol acetates derived from the reduction, and then the acetylation, of the partially methylated residues are analyzed by coupling gas chromatography and mass spectrometry. Their nature, characterized by the position of their methyl groups, defines the cyclic form and the positions of the glycosidic bonds of the corresponding residues.

This analysis shows the presence of glucose and galactose which are substituted in the 4 position, of mannose which is disubstituted in the 4 and 6 positions (confirming the substitution sites of the pyruvate group), of glucuronic acid which is substituted in the 3 position, of glucuronic acid which is substituted in the 4 position and of galacturonic acid which is disubstituted in the 3 and 4 positions. This latter therefore constitutes a branching point of a branched, repetitive hexasaccharide unit, the end of whose side chain is the pyruvate-substituted mannose residue. All the residues are in the pyranose cyclic form.

Location of the Uronic Acids

In order to locate the uronic acids which are present in the repetitive unit, the previously methylated polysaccharide is treated in alkaline medium in accordance with the method of ASPINALL et al. [Carbohydr. Res. 57, pp. C23–C26, (1977)].

This analysis demonstrates the presence of a single compound possessing a O-ethyl group, i.e. the alditol acetate derivative of the galactose residue. The repetitive unit therefore comprises a sequence of three uronic acid residues, which sequence is bonded in position 4 of the galactose residue.

Nuclear Magnetic Resonance Spectroscopy

After the polysaccharide had been depyruvated (by treating it in 2% acetic acid for 2 hours at 100° C.) and dissolved in deuterated water containing added NaCl, the NMR spectra were recorded at 320K on BRUKER AMX-500 and AMX-600 appliances. The "TOCSY" (Total Observed Correlation SpectroscopY) and "COSY" (Correlation Observed SpectroscopY) high field analyses in homonuclear mode, and the spectrum obtained at high field in "HSQC" (Heteronuclear Single Quantum Coherence) heteronuclear mode enabled the signals to be attributed to the protons and carbons of each residue.

The α/β configuration of the glycosidic bonds is defined by the values of the chemical shifts of the signals corresponding to the anomeric carbons and protons. The "NOESY (Nuclear Overhauser Enhancement SpectroscopY) analysis in homonuclear mode determines the arrangement of the residues in the repetitive unit.

Analysis of the HSQC spectrum made it possible to identify six separate residues constituting the repetitive unit, which was consistent with the results of the methylation. The configuration of the glycosidic bonds is determined from the values of the chemical shifts of their anomeric protons and carbons. Most of the signals are attributed to the protons of the different residues by analyzing the TOCSY and COSY spectra. Interpretation of the NOESY spectrum, as a supplement to the results from the β-elimination, made it possible to define the arrangement of the residues:

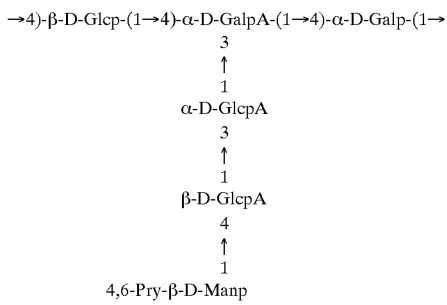

EXAMPLE 3

Determining the Rheologic Properties of the Polysaccharide

Figure 3:
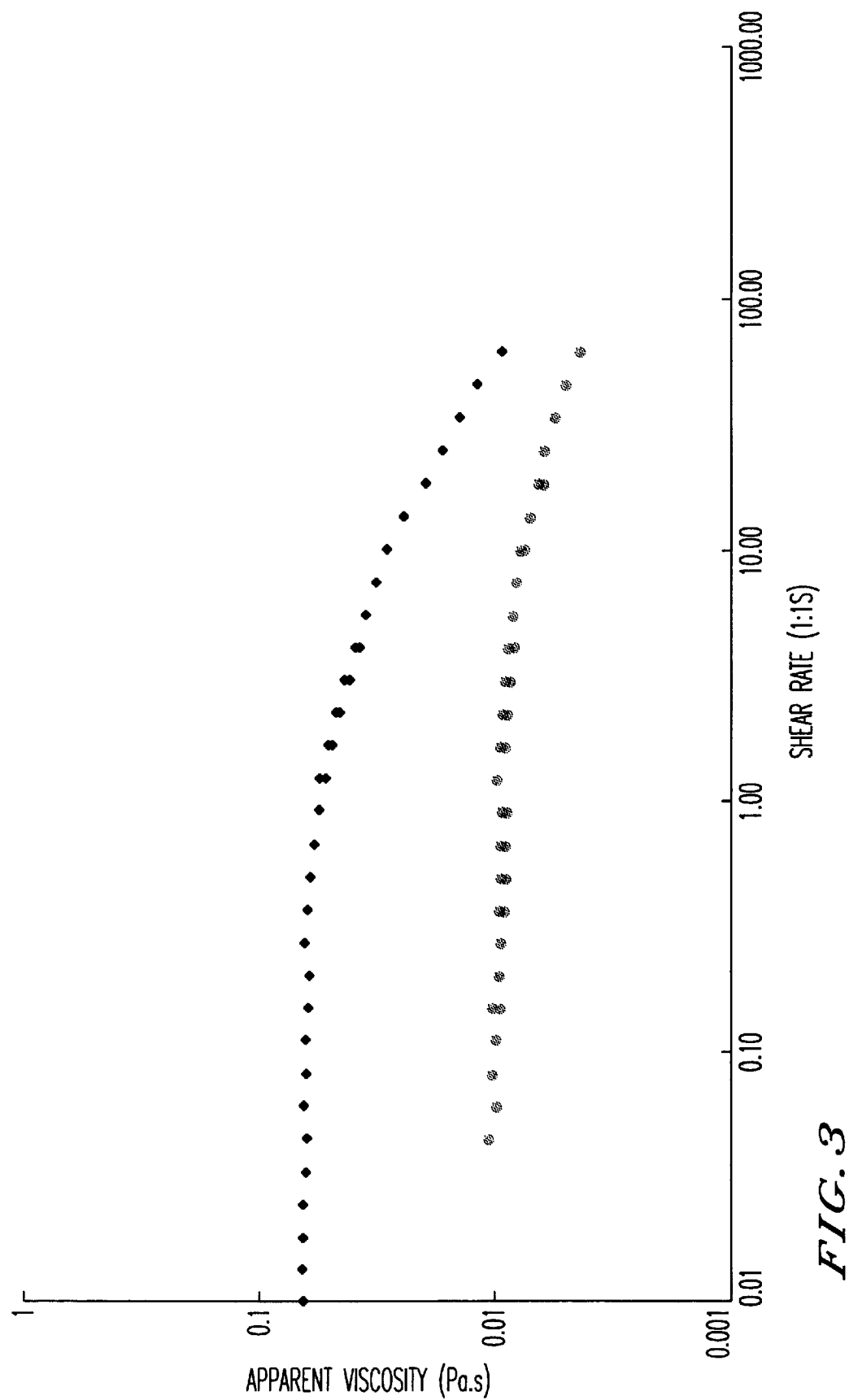
FIG. 3 shows the flow properties of the polysaccharides of the present invention in solution.

The flow properties of the polysaccharide in solution were studied in a semi-dilute system for polymer concentrations of 1 g/l ( ) and 2 g/l (♦) (that is 0.1% and 0.2%) in water to which NaCl had been added to a concentration of 0.1M. The results of the study are expressed by drawing up flow curves which depict the variation in the apparent viscosity as a function of the shear rate during the application of a continuous cycle of increasing and decreasing the rate. FIG. 3 demonstrates the thickening character of the polysaccharide in solution, with a viscosity which depends on the concentration of the polymer. Furthermore, the appearance of the flow curve demonstrates a rheofluidifying behavior, with the existence of a so-called "Newtonian" plateau in the area of the low shear rate values, followed by a decrease in the apparent viscosity as a function of the shear rate in the case of the high rate values.

Plotting such dilute system flow curves for polysaccharide concentrations of from 0.02 to 0.2 g/l (0.002% to 0.02%) enabled its intrinsic viscosity [η] (hydrodynamic volume occupied by one gram of polymer in a given solvent) in a 0.1 M solution of NaCl to be determined. The intrinsic viscosity was thus calculated to be 2 600 ml/g.

All the measurements were carried out at 20° C. using a LOW SHEAR 40 (CONTRAVES) viscosimeter having coaxial cylinders.

Figure 4:
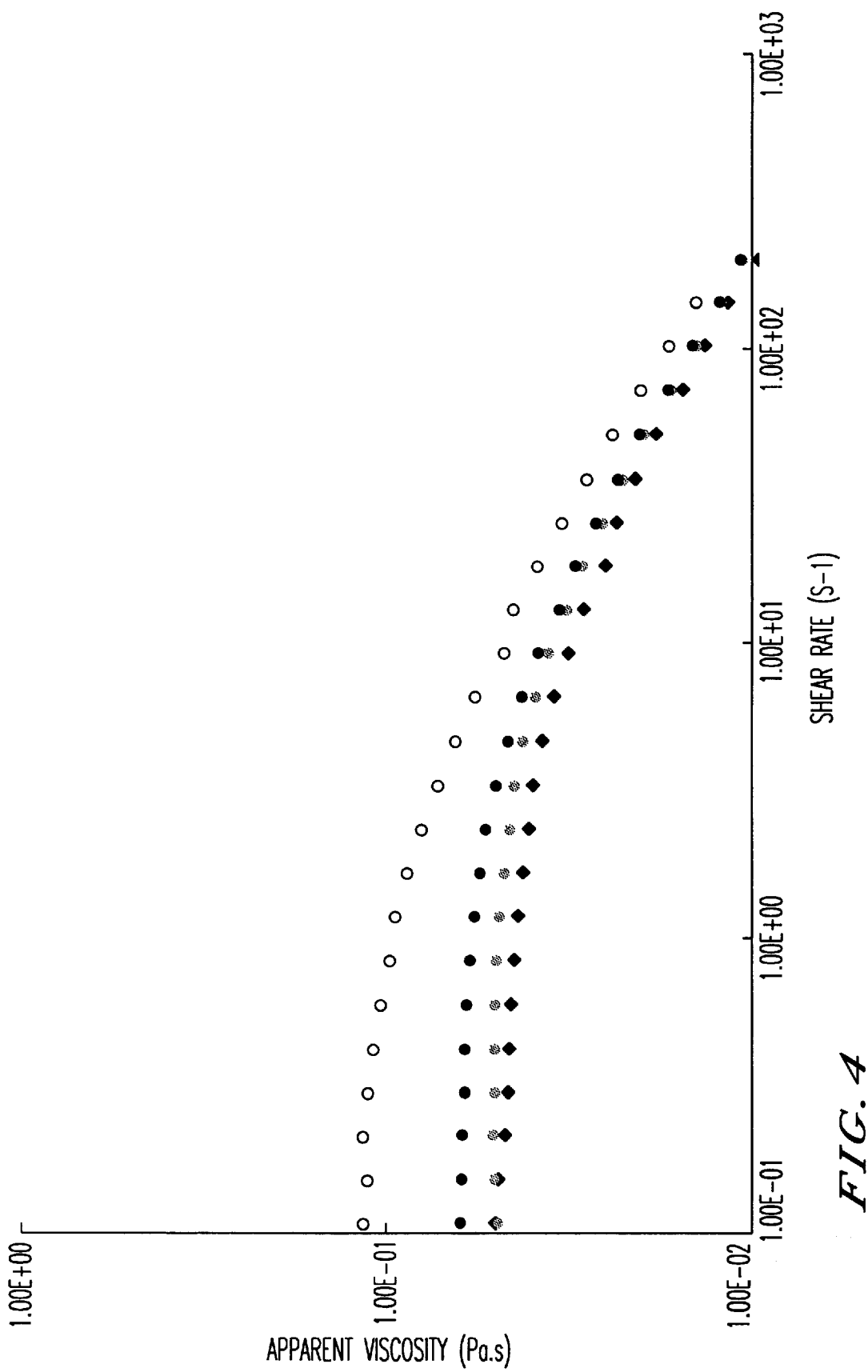
FIG. 4 shows the flow curves for concentrated solutions of the purified polysaccharides of the present invention in an aqueous solvent having an anionic strength of 0.1M.

The flow curves for 2 g/l solutions of the purified polysaccharide in accordance with the invention in an aqueous solvent having an anionic strength of 0.1M were plotted for the presence of various ions. These curves, which are depicted in FIG. 4 ($Mg^{2+}$: ♦; $K^+$: ; $Na^+$: □; $Ca^{2+}$:□) show that, while the viscosity of the polysaccharide increases markedly in the presence of $Ca^{2+}$ ions, it is not, on the other hand, influenced by the presence of $K^+$ or $Mg^{2+}$ ions.

Figure 5:
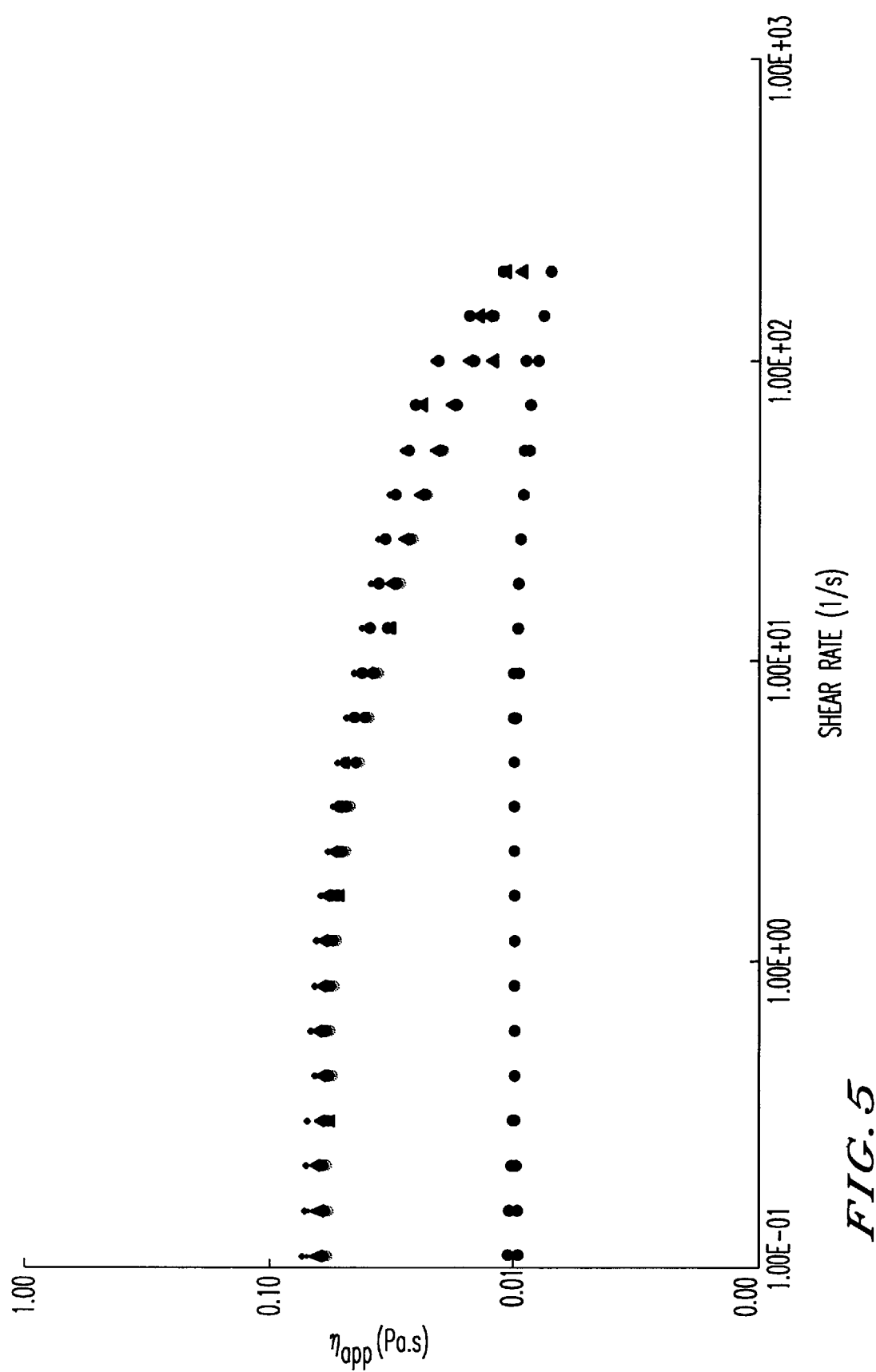
FIG. 5 shows the flow curves obtained for 2 g/l concentration solutions of polysaccharides of the present invention in 0.1M NaCl and at different pH values.

FIG. 5 depicts the flow curves obtained for 2 g/l concentration solutions of polysaccharide according to the invention in 0.1M NaCl and at different pH values (□=pH3; =pH4.5; □=pH6; □=ph7; □=pH9). These curves make it possible to conclude that the thickening properties of the polysaccharide according to the invention are stable over a range of pH values of between 4.5 and 9.

EXAMPLE 4

Use of a Polysaccharide According to the Invention for Preparing Foodstuffs

Table I below gathers together some examples of the incorporation of a polysaccharide according to the invention into foodstuffs, indicating the proportion by weight, based on the total weight of the ingredients, which is generally preferred for each of these foodstuffs.

TABLE I

| | Proportion |
|---|---|
| Dairy products and derivatives: | |
| Ice cream | 0.1 to 1% |
| Cream, whippingcream, toppings | 0.2 to 0.5% |
| Desserts and jellied milks | 0.1 to 0.5% |
| Mousse | 0.5 to 2% |
| Confectioner's custard | 0.5 to 2% |
| Desserts, custard tarts | 0.3 to 0.8% |
| Other tarts, puddings | 0.3 to 0.8% |
| Bottled desserts | 0.1 to 0.8% |
| Milk desserts, dessert creams | 0.2 to 0.1% |
| Cheese spreads | 0.3 to 1% |
| Meat and cooked pork meats: | |
| Cooked pork meats binding agent in fine pastes jelly for covering cooked pork meat products or meat-based products tinned patés | 0.1 to 1.5% |
| Coating for meats and fish | 0.1 to 3% |
| Clinical nutrition products: | |
| Confectionery (water-containing gel), which is fruity or contains fruits: jellies, jellied confectionery | 0.1 to 3% |
| Dehydrated or ready-to-use soups | 0.1 to 0.6% |
| Stabilization of solutions which are liquid or which are to be reconstituted (oral, enteral or parenteral solution) | 0.1 to 0.3% |
| Gruels | 0.1 to 0.3% |
| UHT dessert cream and beverage | 0.1 to 0.5% |
| Cooked and blended dishes | 0.1 to 0.8% |
| Dietary sauces and topping | 0.1 to 0.5% |
| Other foodstuffs: | |
| Reconstituted products: fruit, vegetable, meat and fish pulps | 0.5 to 1.5% |
| Frozen or tinned cake topping | 0.1 to 0.8% |
| Sauces: for salads and various sauces, which are or are not emulsified, and mayonnaise | 0.1 to 1% |
| Sauces and condiments which have been subjected to sterilization and which are being used in cooked dishes | 0.1 to 1% |
| Products for feeding to animals | 0.1 to 3% |
| Jams and jellies | 0.1 to 2% |

TABLE I-continued

| | Proportion |
|---|---|
| Fizzy drinks containing vegetable extracts | 0.1 to 0.3% |
| Clarification of wines and vinegar | 0.1 to 0.5% |
| Powdered desserts which are to be prepared | 0.5 to 2% |
| For retaining moisture in baking and confectionery | 0.1 to 0.5% |

What is claimed is:

1. A purified polysaccharide consisting of combined glucose, galactose, glururonic acid, galacturonic acid and pyruvate-substituted mannose residues, characterized in that said residues are combined in a repetitive hexasaccharide unit of the formula (I):

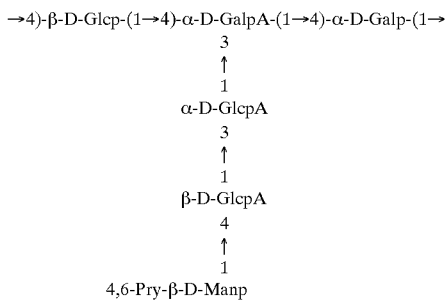

each molecule of said purified polysaccharide containing said combined residues comprising n saccharide units of formula (I), with n being equal to or greater than 1.

2. A purified polysaccharide consisting of combined glucose, galactose, glururonic acid, galacturonic acid and pyruvate-substituted mannose residues, characterized in that said residues are combined in a repetitive hexasaccharide unit of the formula (I):

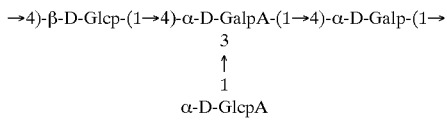

each molecule of said purified polysaccharide containing said combined residues comprising n saccharide units of formula (I), with n being equal to or greater than 1, the purified polysaccharide possessing an average molecular weight ($M_w$) of the order of $10^6$ Da, that is an average degree of polymerization, $DP_n$, of the order of 800, and possessing an intrinsic viscosity, $\eta$, of approximately 2600 ml.g$^{-1}$.

3. A product which is liquid, creamy, pasty, gelatinous or semisolid product containing the purified polysaccharide of claim 1 as a texturizing, stabilizing and/or thickening agent.

4. A product which is liquid, creamy, pasty, gelatinous or semisolid product containing the purified polysaccharide of claim 2 as a texturizing, stabilizing and/or thickening agent.

5. A product according to claim 3 which is a foodstuff.

6. A product according to claim 4 which is a foodstuff.

7. A product which is intended for feeding to humans or animals, characterized in that it comprises at least one purified polysaccharide as claimed in claim 1.

8. A product which is intended for feeding to humans or animals, characterized in that it comprises at least one purified polysaccharide as claimed in claim 2.

9. A product characterized in that it comprises from 0.01 to 10% by weight, based on the total weight of the ingredients of which it consists, of a purified polysaccharide as claimed in claim 1.

10. A product comprising from 0.05 to 5% by weight based on the total weight of the ingredients of which it consists, of a purified polysaccharide as claimed in claim 1.

11. A product characterized in that it comprises from 0.01 to 10% by weight, based on the total weight of the ingredients of which it consists, of a purified polysaccharide as claimed in claim 2.

12. A product comprising from 0.05 to 5% by weight based on the total weight of the ingredients of which it consists, of a purified polysaccharide as claimed in claim 2.

* * * * *